UNITED STATES PATENT OFFICE.

BERTRAND BIBUS AND RUDOLF SCHEUBLE, OF VIENNA, AUSTRIA-HUNGARY.

PROCESS FOR PRODUCING SALICYLIC-ACID-MENTHOL ETHER.

No. 830,043.     Specification of Letters Patent.     Patented Sept. 4, 1906.

Application filed May 13, 1905. Serial No. 260,361. (Specimens.)

*To all whom it may concern:*

Be it known that we, BERTRAND BIBUS and RUDOLF SCHEUBLE, subjects of the Emperor of Austria-Hungary, and residents of Vienna, Austria-Hungary, have invented certain new and useful Improvements in a Process for the Production of Salicylic-Acid-Menthol Ether, of which the following is a specification.

This invention relates to the production of salicylic-acid-menthol ether, and has for its object the provision of a process whereby such ether may be economically produced and whereby the by-products resulting from its manufacture may be advantageously utilized for the subsequent production of salicylic-acid-menthol ether, so that the theoretically possible yield of the finished product may be very nearly attained.

To this end the process of our invention consists in mixing menthol and salicylic acid in quantities slightly in excess of the ratio of their molecular weights and heating the mixture. A current of suitably-reacting dry gas is thereupon injected into and blown through the heated mixture for purposes of removing the water-vapors formed by the combination of salicylic acid and menthol, said combination proceeding directly with elimination of one molecule of water for every molecule of salicylic-acid-menthol ether formed. Said current of gas can be advantageously employed as an aid in heating the mixture. If utilized in this way, it is essential that the temperature of said gas be controlled and regulated so that a degree of heat somewhat in excess of the melting-point of the reaction mixture, and yet never higher than 220° centigrade, is maintained. The various reactions taking place by the hereinbefore-described process result in the formation of salicylic-acid-menthol ether. Various other compounds and by-products exist in the reaction mixture, these being small quantities of uncombined salicylic acid and menthol, menthene, and menthyl compounds. The isolation and purification of the desired ether can be effected by any of the well-known chemical manipulations, the most preferable of these being fractional distillation. The resulting compound is a colorless odorless thick oily liquid soluble in most organic solvents, but insoluble in water. Under a pressure of ten millimeters salicylic-acid-menthol ether boils at 175° centigrade. The compound is capable of distillation *in vacuo*. Saponification of the material results in pure menthol and salicylic acid, respectively.

The material is of particular value as a medicinal or pharmaceutical preparation and finds some application in the arts and in technical work.

According to our invention the preparation of the material is preferably realized according to the manipulations and proportions hereinafter stated. Thirty (30) parts of menthol and one hundred and forty (140) parts of salicylic acid are heated to a temperature of from 140° to 220° centigrade by means of an oil-bath. Gaseous reagents, preferably either hydrogen, carbon dioxid, or hydrochloric-acid gas, advantageously heated to a temperature within the limits previously stated are injected into and blown through the mixture. A perfectly quiet and harmless reaction takes place, the same resulting in the combination of salicylic acid and the menthol in molecular proportions. The reaction mixture is, if necessary, diluted with either ether, petrol, petroleum-ether, or any equivalent and similar organic solvent and unaltered salicylic acid present, because of an excess of this reagent purposely added at the beginning of the process is neutralized by decomposition with an aqueous solution of an alkali-metal carbonate or bicarbonate. Such treatment prepares the reaction mixture for a fractional distillation conducted under reduced pressure and, if necessary, with steam under pressure, the result of such distillation being phenol, menthol, menthene, and, if hydrochloric acid-gas has been employed, as hereinbefore stated, menthyl chlorid and a fraction of salicylic acid-menthol ether. These products pass off in the order mentioned, respectively.

By carefully-conducted fractionation salicylic-acid-menthol ether can be secured in an absolutely pure state—that is, the desired product results from this operation if the fraction temperatures are closely watched.

An important feature of our invention is the utilization of the by-products of the hereinbefore-mentioned process for the production of additional quantities of the ether desired, and it is due to the utilization of these by-products, as hereinafter described, that a yield of ether approximating the one theoretically possible can be attained. To this end the distillates—that is, the by-products resulting from the fractionation of the salicylic-acid-menthol ether—are freed from phenol by either neutralization with a chemical of the alkali class or by a subsequent carefully-conducted fractional distillation. Neutralization with an alkali—for example, with sodium or potassium hydroxid—is preferred. Menthol, menthene, and, dependent upon whether or not hydrochloric acid gas has been previously employed, menthyl chlorid entirely freed from phenol result. The treatment of such menthol, menthene, and menthol chlorid with hydrochloric acid suitably applied under increased pressure results in a uniform mixture of menthyl chlorid. A substitution reaction between this menthyl chlorid and any metallic salicylate—sodium salicylate, for example—results in salicylic-acid-menthol ether and the chlorid of the metal added as metallic salicylate. The use of sodium salicylate for the step of the by-product process will therefore yield the salicylic-acid-menthol ether and sodium chlorid. The salicylic-acid-menthol ether may be secured precisely as in the direct production of the ether—viz., by carefully-conducted fractional distillation. The herefrom-resulting compound is identical with the product of the direct process hereinbefore described.

The quantity of salicylic-acid-menthol ether secured from the herein-described direct and by-product processes is very nearly the equivalent of the theoretical yield possible from calculated initial quantities of salicylic acid and menthol.

It will be apparent that other gases than those hereinbefore mentioned—namely, hydrogen, carbon dioxid, and hydrochloric-acid gas—will perform the functions of a dehydrating agent necessary for the success of the combining reaction between salicylic acid and menthol, and it will be understood that such gases come within the scope of this invention. It will, furthermore, be apparent that the hydrochloric-acid reagent employed for the production of menthyl chlorid in the by-product process can be successfully replaced by any of the halogen compounds of hydrogen, these being hydrogen iodid, hydrogen fluorid, hydrogen bromid, and that therefore these reagents also come within the scope of our invention.

We claim—

1. The herein-described process of producing salicylic-acid-menthol ether, consisting in heating salicylic acid and menthol to effect combination of said materials in molecular proportions, in dehydrating the reaction mixture with gaseous reagents, in neutralizing said reaction mixture with carbonic-acid salts of the alkali metals, and in fractionally distilling the resulting mixture thereby separating the salicylic-acid-menthol-ether fraction from other portions of the distillate.

2. The herein-described process of producing salicylic-acid-menthol ether, consisting in heating salicylic acid and menthol to effect combination of said materials in molecular proportions, in dehydrating the reaction mixture with hydrochloric-acid gas, in neutralizing said reaction mixture with carbonic-acid salts of the alkali metals, and in fractionally distilling the resulting mixture thereby separating the salicylic-acid-menthol ether fraction from other portions of the distillate.

3. The herein-described process of producing salicylic-acid-menthol ether, consisting in heating salicylic acid and menthol to effect combination of said materials in molecular proportions, in dehydrating the reaction mixture with gaseous reagents, in neutralizing said reaction mixture with sodium carbonate, and in fractionally distilling the resulting mixture thereby separating the salicylic-acid-menthol-ether fraction from other portions of the distillate.

4. The herein-described process of producing salicylic-acid-menthol ether, consisting in heating salicylic acid and menthol the effect combination of said materials in molecular proportions, in dehydrating the reaction mixture with gaseous reagents, in neutralizing said reaction mixture with carbonic-acid salts of the alkali metals, in fractionally distilling the resulting mixture thereby separating the salicylic-acid-menthol-ether fraction from other portions of the distillate and in neutralizing the phenol of said distillate with alkali reagents.

5. The herein-described process of producing salicylic-acid-menthol ether, consisting in heating salicylic acid and menthol to effect combination of said materials in molecular proportions, in dehydrating the reaction mixture with gaseous reagents, in neutralizing said reaction mixture with carbonic-acid salts of the alkali metals, in fractionally distilling the resulting mixture thereby separating the salicylic-acid-menthol-ether fraction from other portions of the distillate and in neutralizing the phenol of said distillate with sodium hydroxid.

6. The herein-described process of producing salicylic-acid-menthol ether, consisting in heating salicylic acid and menthol to effect combination of said materials in molecular proportions, in dehydrating the reaction mixture with gaseous reagents, in neutralizing said reaction mixture with carbonic-acid salts of the alkali metals, in fractionally distilling the resulting mixture thereby separating the salicylic-acid-menthol-ether fraction from other portions of the distillate, in neutralizing the phenol of said distillate with alkali reagents, and in treating with halogen compounds of hydrogen.

7. The herein-described process of producing salicylic-acid-menthol ether, consisting in heating salicylic acid and menthol to effect combination of said materials in molecular proportions, in dehydrating the reaction mixture with gaseous reagents, in neutralizing said reaction mixture with carbonic-acid salts of the alkali metals, in fractionally distilling the resulting mixture thereby separating the salicylic-acid-menthol-ether fraction from other portions of the distillate, in neutralizing the phenol of said distillate with alkali reagents, and in treating with hydrochloric acid.

8. The herein-described process of producing salicylic-acid-menthol ether, consisting in heating salicylic acid and menthol to effect combination of said materials in molecular proportions, in dehydrating the reaction mixture with gaseous reagents, in neutralizing said reaction mixture with carbonic-acid salts of the alkali metals, in fractionally distilling the resulting mixture, thereby separating the salicylic-acid-menthol-ether fraction from other portions of the distillate, in neutralizing the phenol of said distillate with alkali reagents, in treating with halogen compounds of hydrogen, and in addition of a metallic salicylate.

9. The herein-described process of producing salicylic-acid-menthol ether, consisting in heating salicylic acid and menthol to effect combination of said materials in molecular proportions, in dehydrating the reaction mixture with gaseous reagents, in neutralizing said reaction mixture with carbonic-acid salts of the alkali metals, in fractionally distilling the resulting mixture thereby separating the salicylic-acid-menthol-ether fraction from other portions of the distillate, in neutralizing the phenol of said distillate with alkali reagents, in treating with halogen compounds of hydrogen, and in addition of sodium salicylate.

10. The herein-described process of producing salicylic-acid-menthol ether, consisting in heating salicylic acid and menthol to effect combination of said materials in molecular proportions, in dehydrating the reaction mixture with gaseous reagents, in neutralizing said reaction mixture with carbonic-acid salts of the alkali metals, in fractionally distilling the resulting mixture thereby separating the salicylic-acid-menthol-ether fraction from other portions of the distillate, in neutralizing the phenol of said distillate with alkali reagents, in treating with halogen compounds of hydrogen, in addition of a metallic salicylate, and in fractionally distilling the reaction mixture thereby separating the salicylic-acid-menthol-ether fraction.

In testimony whereof we affix our signatures in presence of two witnesses.

BERTRAND BIBUS.
RUDOLF SCHEUBLE.

Witnesses:
 IFUR FUCHS,
 ALVESTO S. HOGUE.